INVENTOR.
ALLEN F. PODELL
BY
Kenway, Jenney & Hildreth
ATTORNEYS

INVENTOR.
ALLEN F. PODELL
BY
Kenway, Jenney & Hildreth
ATTORNEYS

April 21, 1970 A. F. PODELL 3,508,171

TRANSMISSION LINE HYBRIDS HAVING NOT MORE THAN FOUR AND NOT LESS THAN TWO FERRITE ELEMENTS

Filed Aug. 22, 1968 3 Sheets-Sheet 3

INVENTOR.

ALLEN F. PODELL

BY Kenway, Jenney & Hildreth

ATTORNEYS 3,508,171

TRANSMISSION LINE HYBRIDS HAVING NOT MORE THAN FOUR AND NOT LESS THAN TWO FERRITE ELEMENTS

Allen F. Podell, Cambridge, Mass., assignor to Adams-Russell Co., Inc., Waltham, Mass., a corporation of Massachusetts Filed Aug. 22, 1968, Ser. No. 754,678
Int. Cl. H01p 5/12
U.S. Cl. 333—11 10 Claims

ABSTRACT OF THE DISCLOSURE

The specification describes a low loss four port transmission line hybrid circuit. Four of the six transmission lines forming the hybrid are connected in a bridge configuration. The two non-bridge connected lines are connected to the diagonal terminals of the bridge. The non-bridge connected ends of opposed lines forming the bridge are electrically connected together. In contrast to prior constructions, this specification discloses both balanced and unbalanced hybrid circuits of the type described using not more than four or less than two separate ferrite elements.

BACKGROUND OF THE INVENTION

My invention relates to improved electrical hybrid circuits and more particularly to hybrid circuits which exhibit both reduced loss and lower cost as compared to prior hybrid circuits of this type.

Hybrid circuits for radio frequency signals are devices which are characterized generally as having four electrical terminals or "ports." These ports are arranged in two pairs. A high frequency (i.e. radio frequency) signal applied as an input signal to one of a first pair of ports will divide equally in power and appear at each of the other pair of ports, but will not appear at the other port of the first pair which includes the excited port. This relationship generally holds true for all four ports. A general description of the properties of hybrid junctions as well as some early examples of them may be found in Reintjes and Coate, "Principles of Radar" (3rd ed.), 1952, McGraw-Hill Book Company, pp. 825–834.

More recently the design of hybrid circuits has become quite sophisticated and their size has been substantially reduced. A hybrid junction employing transmission line transformers in what might be termed a "bridge" configuration is illustrated and described in U.S. Patent No. 3,317,849 to Smith-Vaniz. The general arrangement for a hybrid such as that shown in the Smith-Vaniz patent has also been realized using six transmission lines rather than four transmission line transformers. Such a hybrid is illustrated in FIGURE 1 of this specification and will be described more fully below. However, it should be here noted that in general each of the six transmission lines was required to pass through one or more ferrite beads or was wrapped on at least one ferrite core.

In order to achieve so-called "infinite cut-off" the transmission lines are made as short as physically possible and are terminated in their characteristic impedance. Under these circumstances, if the transmission line is formed of a length of coaxial cable, there is a possibility of an undesired transmission mode existing between the shield of the coaxial cable and ground, as well as a desired mode between the inner conductor and the shield of the coaxial connector. To prevent operation of this undesired mode, each transmission line is threaded through one or more ferrite beads or is wrapped on a ferrite core if it is of twisted wire. If the transmission line consists of a twisted pair of wires, the ferrite core or other ferrite element insures that the wires function as a transmission line and not simply as a pair of wires.

In bridge type hybrids using transmission lines heretofore made, each line was threaded through a separate ferrite bead or beads, or wrapped on a separate core (cf. U.S. Patent 3,317,849). Thus, if a single bead was used on each line at least six beads were required for each hybrid, i.e. at least one for each transmission line. While the beads or cores perform the desirable function described above, they also dissipate energy which introduces loss and further they add significantly to the cost of the hybrid circuit.

I have found in the so-called bridge-type hybrids that the number of ferrite beads or cores can be reduced at least to four and in some cases to three or two by putting certain of the transmission lines through the same bead or wrapping them on the same core. In addition to reducing the loss resulting from the reduction in the number of beads or cores there is also a further reduction in energy loss as a result of the fact that when two or more transmission lines pass through the same bead or core, the energy loss is only slightly greater than when one line passes through the core. It therefore is very desirable to pass more than one transmission line through a ferrite bead or wrap them on the same core if at all possible.

The reduction in the number of ferrite beads or cores, and the consequent cost reduction is apparent when it is considered that under some circumstances two, three or more beads were used on each line. Using the technique of my invention typically six or nine beads will perform the function previously performed by twelve or eighteen beads respectively. Similarly, a configuration using six cores or four cores and two beads, may use only two cores and two beads or in some cases only three cores.

From the foregoing it will be apparent that a principal object of my invention is to provide improved transmission line hybrid circuits of the bridge type having substantially infinite cut-off. Another object of my invention is to provide improved hybrid circuits of the type described having reduced losses as compared to similar hybrid circuits previously available.

A further object of my invention is to provide improved hybrid circuits of the type described of lower cost than those heretofore available.

A final stated object of my invention is to provide hybrid circuits of the type described having smaller physical size than those heretofore available.

Other objects of the invention will in part be obvious and will in part appear hereinafter.

The invention accordingly comprises the features of construction, combination of elements, and arrangements of parts exemplified in the constructions hereinafter set forth.

For a fuller understanding of the nature and objects of my invention, reference should be had to the following detailed description taken in connection with the accompanying drawing, in which.

GENERAL DESCRIPTION

Figure 1:
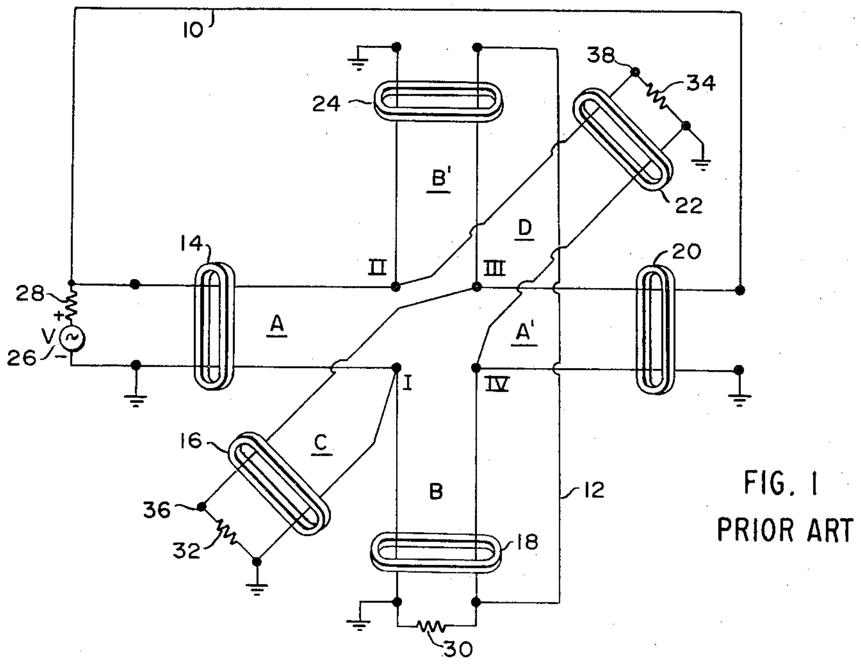
FIG. 1 PRIOR ART
FIGURE 1 is a schematic illustration of an infinite cut-off transmission line hybrid of the bridge type which exemplifies the prior art.

In FIGURE 1, I have illustrated a conventional infinite cut-off hybrid formed from six transmission lines. The transmission lines which illustratively may be coaxial cable or a twisted pair of wires are illustrated by a pair of parallel lines. The six lines are identified as A, C, B, A', D and B'. The four transmission lines A, A' B and B' form the "bridge" and as shown their inner ends are connected in series at the terminals identified as I, II, III and IV. The outer ends of the transmission lines A and A' and B and B' are connected together. Thus the lower terminal of the lines A and A' are grounded and their upper terminals, as seen in FIGURE 1, are connected by the wire 10. Similarly the left-hand terminal as the outer end of the B and B' lines are grounded and the right-hand outer end terminals are connected by the lead 12. One pair of ports of the hybrid circuit is formed between the lead 10 and ground and the lead 12 and ground. Of course, since one terminal of each of the transmission lines is grounded this pair of ports is unbalanced. If it were desired to have balanced ports, i.e. ungrounded, then of course two wires would be required to connect the outer terminals of each of the lines A and A' and B and B' and the pair of ports would be between these wires.

The second pair of ports is formed by the outer terminals of the transmission lines C and D whose inner ends are connected diagonally across the "bridge" formed by the transmission lines A, A', B and B'. Thus the inner ends of the transmission line C are connected to the diagonal terminals labelled I and III, and the inner ends of transmission line D are connected to the diagonal points of the "bridge" II and IV. The "bridge" may also be sometimes referred to herein as the "cross."

In the illustrative embodiment shown in FIGURE 1 the second set of ports is also unbalanced.

It will also be observed that each transmission line is wrapped on a ferrite core or passes through a ferrite bead for reasons explained above. Thus transmission line A passes through bead 14, C through bead 16, B through bead 18, A' through bead 20, D through bead 22 and B' through bead 24. The hybrid circuit of FIGURE 1 operates properly only when all ports are properly terminated. In the illustration, the port formed by the paralleled outer ends of the A and A' lines is being used as an input port, the source 26 being connected in series with a resistor 28 equal to the input impedance of the port and the series combination connected across the port. Each of the other ports is terminated in a resistor appropriate for the port. If the transmission lines forming the hybrid circuit all have a characteristic impedance $Zo$, then input impedance of the pair of ports formed by the A and A' lines and the B and B' lines will be $Zo/2$, while that of the pair of ports formed by the lines C and D will be $Zo$. Thus resistor 30 which terminates the B–B' port is one-half the value of the characteristic impedance of the transmission lines; resistors 32 and 34 which terminate lines C and D are equal to the characteristic impedance of the transmission line.

Assume, for purposes of explanation that a radio-frequency source 26, connected as shown has the instantaneous polarity indicated and the applied signal at the time has an amplitude V. It is convenient, in analyzing the circuit of FIGURE 1 to consider each of the transmission lines as a transmission line "balun," i.e. a device for connecting an unbalanced source to a balanced load or a balanced source to an unbalanced load.

Thus if the unbalanced source of amplitude V is applied to the end of the transmission lines A and A', it will appear balanced at the bridge. Thus bridge terminals II and III will assume a potential $+V/2$ with respect to ground while terminals I and IV will have a potential with respect to ground of $-V/2$. From inspection of the circuit it will be apparent that there is no potential difference across the lines B and B' and hence no energy is transmitted outwardly from the "cross" to the terminating resistor 30. It will also be apparent that the inner ends of the lines C and D are subjected to the full voltage. By conventional balun operation, the upper terminal 36 of the outer end of line C and the upper terminal 38 of the outer end of line D will each assume a potential V. Power is divided equally to the loads 32 and 34 terminating the lines C and D.

From the foregoing, it is apparent that for the example stated, a voltage difference of $V/2$ exists between the outer grounded terminal of the A, A', C and D transmission lines and the cross terminal. If as is typically the case, the transmission lines are formed of a coaxial cable having a shield and center conductor, this voltage drop must exist across the shield. The shield and a ground plane would function as a transmission line were this mode of transmission not suppressed and this is the purpose of the ferrite beads 14–26. If twisted pairs of wires rather than coaxial cable were used to form the transmission lines, the beads 14–26 would be annular ferrite cores.

I have found however that more than one of the transmission lines may thread a ferrite bead or be wound on one core if the voltage drop across the ferrite for one of the transmission line conductors of each line is the same in both direction and amplitude. Thus, from inspection of FIGURE 1, it is apparent that the three transmission lines A, C and B may thread a single bead or be wrapped on a single core since the outer end of one conductor in each case is grounded and the inner ends are conected together at the same cross terminal I. Thus, the voltage drop across the ferrite associated with these lines will always be identical. Hence the three lines threading the cores 14–18 can thread a single core if they thread it in the same direction. Similarly by insepction the lines A' and D may thread a single ferrite core since again the outer lower terminals are grounded and both of the inner ends of the ground conductors are connected to the cross terminal IV. The B' transmission lines has no such common connections and therefore requires a separate core.

Figure 2:
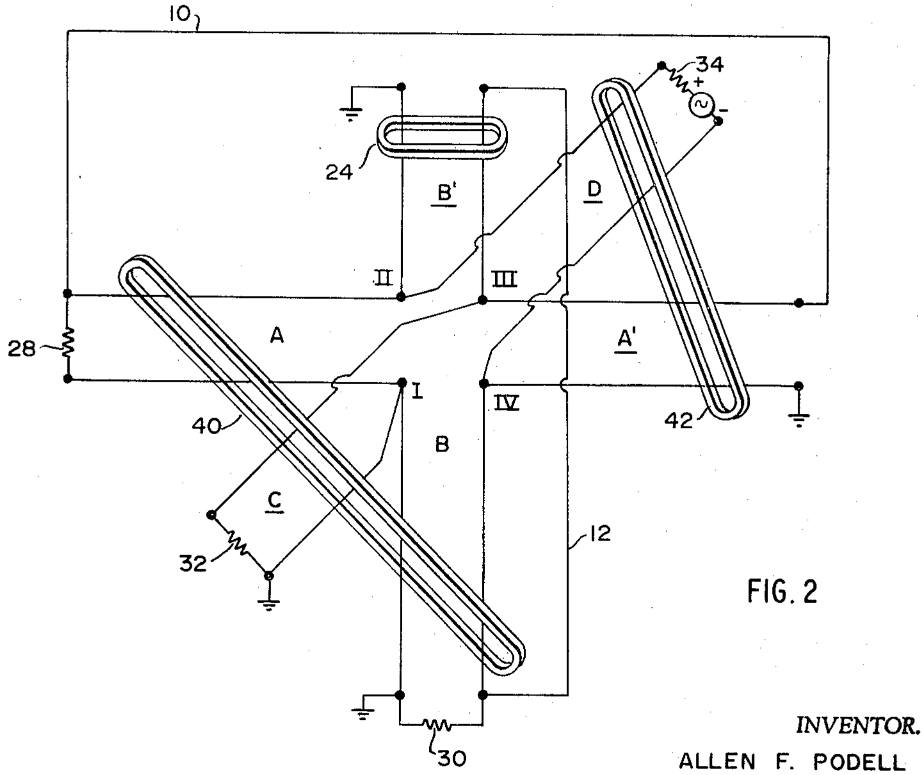
FIGURE 2 is a schematic drawing similar to FIGURE 1 showing how three cores or three (or multiples of three) ferrite beads can be substituted for the six cores or six (or multiples of six) beads used in FIGURE 1.

An unbalanced hybrid circuit similar to that illustrated in FIGURE 1 is shown in FIGURE 2 with the three cores arranged as described. Thus the core 40 is threaded by the three lines A, C, and B and the core 42 by the lines A' and D. While the cores 40 and 42 have been illustrated as being fairly large in FIGURE 2 this is only for convenience in illustration. In fact, the cores are physically of the same outer diameter and length and the size of the center hole or annulus is enlarged to permit two or three lines to traverse it. Thus, it is possible to reduce the number of required ferrite cores by a factor of two. In addition to the cost saving and the reduction in energy loss, it also appears that when one of the two or three lines threading a given core has supplied sufficient energy to energize it, there is no additional loss if additional conductors are threaded through the core. Thus, for the configuration of FIGURE 2 the loss in the hybrid as a result of the cores is about ½ that of the configuration of FIGURE 1.

It is alos theoretically possible to reduce the number of cores for the hybrid circuit illustrated even further. If the drop across the one conductor of the B' line, i.e. from terminal II of the cross to ground and across the corresponding conductors of the A' and D lines, i.e. from terminal IV to ground is tabulated as a function of the port excited (assuming an excitation source such as described in connection with FIGURE 1 having a positive polarity connected to the ungrounded terminal) it will be observed that the voltage drop across the B′ shield is identical in magnitude but opposite in phase to that on the A′ and D′ line shields. Such a table is reproduced below:

TABLE I

| Excited port | II to ground | IV to ground |
|---|---|---|
| A–A′ | +V/2 | −V/2 |
| B–B′ | −V/2 | +V/2 |
| C | 0 | 0 |
| D | +V/2 | −V/2 |

Figure 3:
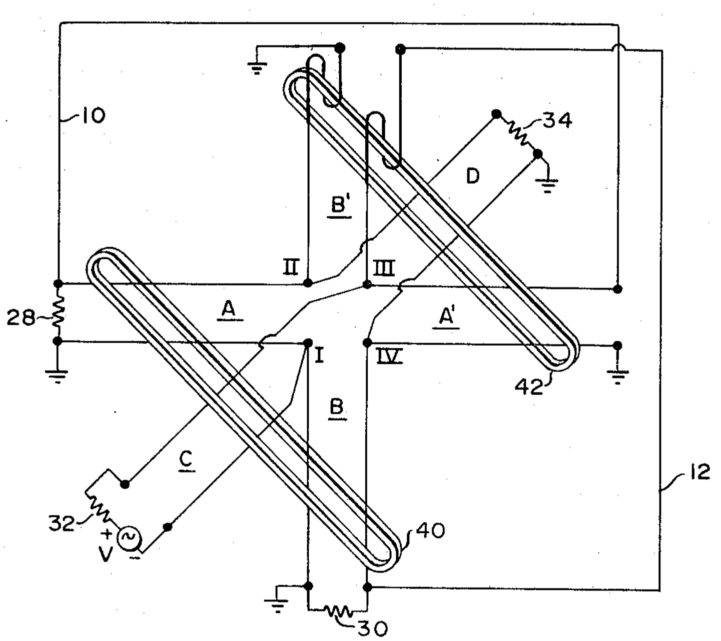
FIGURE 3 is a schematic drawing showing how the transmission line hybrid of FIGURE 2 may be made using only two cores or beads if the transmission lines are formed of twisted pairs.

Under these circumstances, if the B′ line threads the same core as the A′ and D lines, but in the *opposite* direction, one core may be used for all three lines. Such a construction is illustrated in FIGURE 3 where lines A′, D and B′ all pass through the core 42 but the line B′ threads the core in a direction opposite to that of the A′ and D lines so that, so far as the core is concerned, the voltage drops are all in the same direction.

In practice, it is not usually convenient to pass two or more coaxial lines through a ferrite bead or core in opposite directions. This therefore means that the lines B′, A′ and D must be twisted pairs of wires. Since such twisted pairs limit high frequency response and in any event it is desirable to make the circuit symmetrical, the A, C and B lines are similarly made of twisted pairs and all of these may be wrapped on a single annular ferrite core. Such a construction is illustrated in U.S. Patent 3,317,849 previously cited for a single twisted pair. However, rather than requiring four cores as there described (as six if the ports formed by the diagonals of the cross are brought out on transmission lines as described herein), only two such ferrite cores are required. This results in a substantial reduction in the physical size of the hybrid circuit as well as reducing loss and being less costly to manufacture.

Figure 4:
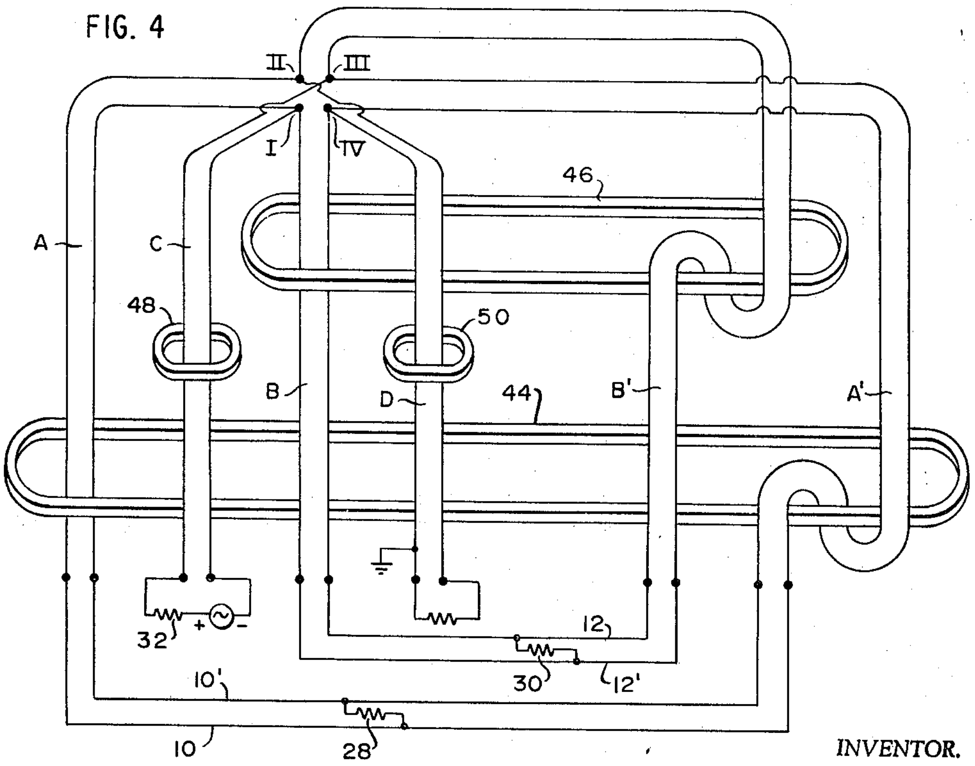
FIGURE 4 is a schematic illustration slightly different in form than previous figures but equivalent to them, illustrating that the ferrite cores required when two of the ports of the hybrid are balanced and two are unbalanced.

As so far described, all ports of the hybrid circuit have been considered to be unbalanced. In some instances, it is desirable to have at least one pair of balanced ports. In what follows, it is assumed that the A–A′ port and the B–B′ port are to be balanced while the C and D ports are to be considered unbalanced. FIGURE 4 is electrically similar to FIGURES 1–3 but is of a somewhat different format to more clearly illustrate the construction to be described.

Thus in FIGURE 4 the "cross" or "bridge" is at the top of the figure and the six transmission lines lead from it. The A and A′ lines thread the core 44, the A line in a first direction and the A′ line in the opposite direction. The core 46 is provided for the B and B′ lines, the B lines threading it in a first direction and the B′ line in a second direction. The core 48 is provided for the C line and core 50 for the D line.

The fact that this arrangement is proper may be seen by considering the following table which tabulate the instantaneous voltage at various points in the hybrid circuit at a time when the ungrounded C port terminal is supplied with an R.F. voltage of instantaneous amplitude +V and the other terminals are terminated in their appropriate impedances.

TABLE II

| Terminal: | Voltage |
|---|---|
| C (ungrounded) | +V |
| I | $-V/2$ |
| II | 0 |
| III | $+V/2$ |
| VI | 0 |
| **10** | $+V/4$ |
| **10′** | $-V/4$ |
| **12** | $+V/4$ |
| **12′** | $-V/4$ |

it will be observed that for the A transmission line in going from cross terminal I to port terminal 10′ there is a voltage rise of $V/4$ and there is a similar rise in going from cross terminal II to terminal 10 of the port. For transmission line A′, in going from cross terminal III to port terminal 10 there is a drop in voltage of $V/4$ and similarly from terminal IV to port terminal 10′ there is a drop of $V/4$. Thus the drop across line A and A′ is equal in magnitude but opposite in direction and hence both may be wound on the same core if wound in opposite directions. The same situation exists with the B and B′ lines as shown below.

TABLE III

| | Amount and direction of rise and fall |
|---|---|
| B line: | |
| I to **12′** | Rises $V/4$ |
| IV to **12** | Rises $V/4$ |
| B′ line: | |
| III to **12** | Drops $V/4$ |
| II to **12′** | Drops $V/4$ |

From considerations of symmetry, the same conditions will obtain as a result of excitation from the D port.

Since the A and A′ lines and B and B′ lines must traverse the cores in opposite directions, they are usually formed of twisted pairs of wire wound on annular cores. The lines C and D may be either twisted pairs or coaxial cables. If coaxial cables are used for these lines then the ferrite 48 and 50 on the C and D lines may be ferrite beads slipped over the lines. Since the drop across the A, A′, B and B′ lines is small they can be effectively "choked" by the ferrite when only about two turns are wound on the core. Even though these lines are twisted pairs such a construction provides very wide bandwidth. If the C and D lines were also twisted pairs, they would require more turns because of the greater voltage drop across them. However if they are coaxial cables which are "choked" with ferrite beads they have essentially infinite high frequency cut-off and such a hybrid circuit construction exhibits excellent high frequency response. Thus, it may be desirable to use coaxial cables for the lines C and D if good high frequency performance is desired and the arrangement of FIGURE 4 permits this.

Figure 5:
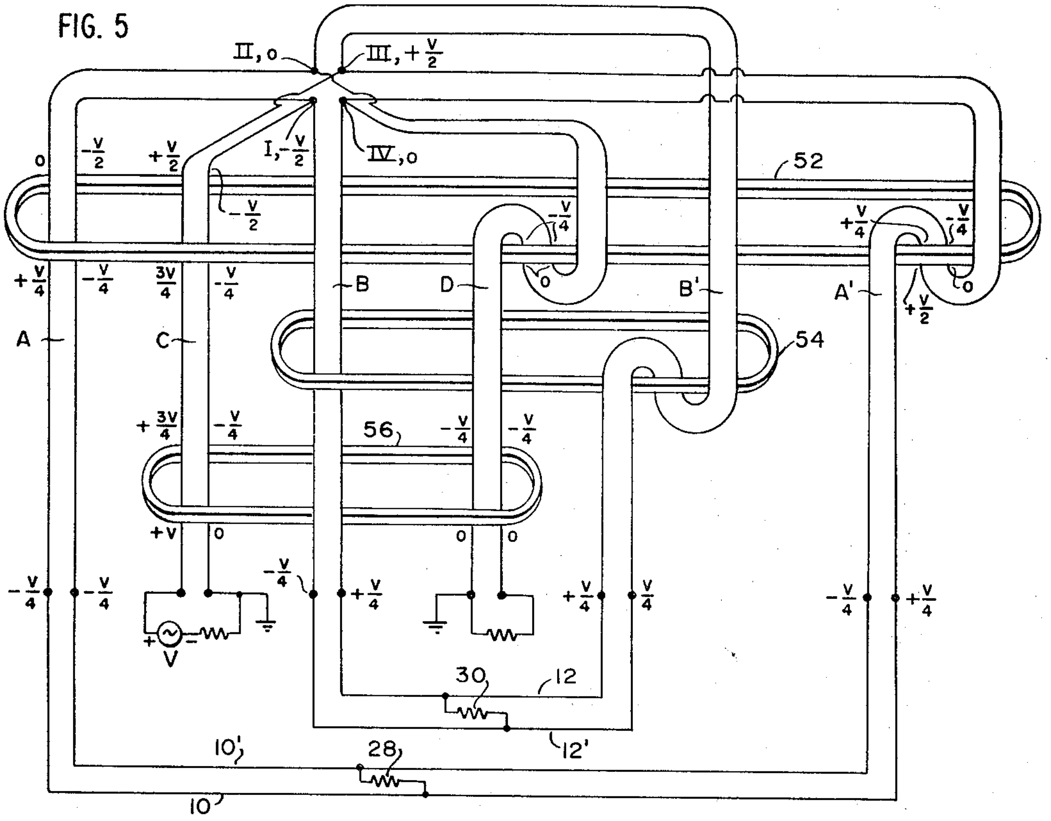
FIGURE 5 is a schematic illustration similar to FIGURE 4 illustrating the manner in which the transmission lines are threaded through three rather than four cores as illustrated in FIGURE 4.

If high frequency performance is not vital, the number of cores may be further reduced to three for the balanced configuration as shown in FIGURE 5. To facilitate an understanding of the operation of the circuit shown in FIGURE 5, the voltages on each side of the various cores for excitation at the C port in the manner described above are indicated.

As shown in FIGURE 5, the A, C, D and A′ lines are wound on a first core 52, the A and C lines in a first direction and the A′ and D lines in the opposite direction. The B and B′ lines are wound on a second core 54 which is the same as the core 46 in FIGURE 4. Finally, the C and D lines are wound on a third core 56, the C line and the D passing through the core in the same direction.

The voltage on each conductor of each line as it passes through each of the cores 52 and 56 is indicated on the drawing for excitation at the C port at the time when the radio frequency source connected thereto has an amplitude V and the polarity indicated. It will be observed that each of the voltage drops across the core for each conductor of each transmission line are identical in magnitude and in the same direction. Thus in proceeding from the top of FIGURE 5 to the bottom, the drop across the first core 52 is of magnitude $+V/4$ and that across the core 56 is of like amount and polarity, i.e. in proceeding from the top of the figure to the bottom any voltage on a line at the top of the core will have a value of $+V/4$ added to it as it emerges from the core at the bottom. On the D line, since it reverses as it passes through the core 52, for excitation from the C port it will have zero potential at its lower terminals which form the D port. Both conductors of the section of the D line between the cores 52 and 56 will have a potential on them of $-V/4$ at the time and for the polarity of excitation at the C port indicated.

Of course, one can determine similar values for excitation from the D port. However, the fact that the configuration shown is proper for excitation from the D port can be simply verified. Assume that a radio frequency source is connected across the D port and the right-hand terminal is positive with respect to ground at a given instant of time with a voltage +V. Then, by conventional balun action, the terminal II will be at a voltage $+V/2$, and the terminal IV at a voltage $-V/2$. The terminals I and III will be at 0 potential. The voltage across the core 56 will be of the same value and polarity with excitation from the C port, but that across the core 52 will be reversed because of the reversal of the winding direction of the D line on this core. Thus the net drop across the C line will be zero since it traverses both cores. For the A and A′ lines which traverse only the core 52 it will be observed that this core drop is in the proper direction and amount to provide the correct output voltage at the A and A′ terminals.

Thus it will be apparent that a balanced hybrid using only three ferrite cores may be fabricated, using the techniques of my invention, provided that all lines are of twisted wire so that they may thread the three cores in the appropriate direction as shown in FIGURE 5.

Figure 6:
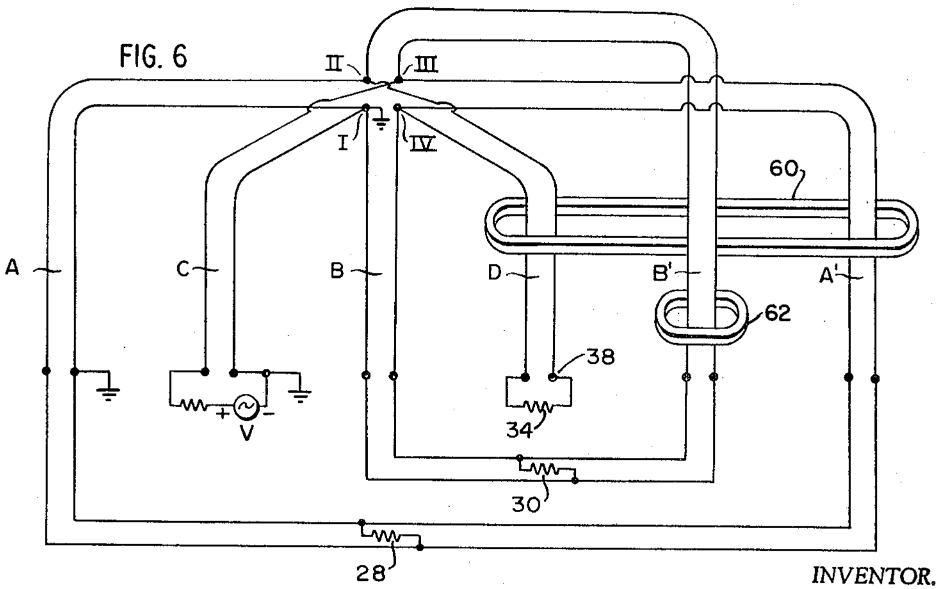
FIGURE 6 is a schematic illustration similar to FIGURES 4 and 5 illustrating an unbalanced hybrid circuit using only two cores.

In FIGURE 6 I have illustrated an unbalanced hybrid circuit using only two cores, one on the D and A′ lines and a second on the B′ line. The operation of this circuit will be explained assuming the terminal I of the bridge is grounded, although as will be explained below, this is not required.

It will be recalled that the drops across the lines A, B and C are identical since one of the conductors of each of these lines is connected to the common terminal I and the other end of each of the conductors is grounded in the unbalanced configuration. Thus, if terminal I is grounded, there will be no voltage difference across these lines and no cores will be required. Hence the core 40 of FIGURE 2 may be eliminated.

Operation of the circuit of FIGURE 6 for excitation from the C or D ports will be as previously described. For excitation from the A–A′ port using an R.F. source whose instantaneous polarity is such that the left hand conductor of the A line is positive with respect to ground by an amount +V, terminal II will be at a potential +V and the terminal I will be at ground potential. It might be considered that the voltage on terminal III under these circumstances would be $+V/2$ and that on terminal IV would be $-V/2$ as in the hybrid circuit of FIGURES 1 and 2. However, the voltage appearing across the inner end of the transmission line always adjusts itself to minimize the voltage drop and therefore the loss across the line. This loss will be minimum if the voltage at terminal III is +V and at terminal IV is 0. Thus, no power is transmitted to the B–B′ port and hybrid action is achieved. Further, it will be observed that no drop occurs across the ferrite element 60 associated with the D and A′ lines. Similarly there will be no drop across the core 62 when the B–B′ port is excited.

Table IV below lists the values of voltage at each of the bridge terminals and across the output ports for excitation in the manner described for each input port.

TABLE IV

| Excitation port | Terminal voltages | | | | Port voltages | | | |
|---|---|---|---|---|---|---|---|---|
| | I | II | III | IV | A–A′ | B–B′ | C | D |
| A–A′ | 0 | +V | +V | 0 | (*) | 0 | +V | +V |
| B–B′ | 0 | 0 | +V | +V | 0 | (*) | +V | −V |
| C | 0 | +V/2 | +V | +V/2 | +V/2 | +V/2 | (*) | 0 |
| D | 0 | +V/2 | 0 | −V/2 | +V/2 | −V/2 | 0 | (*) |

*Denotes excitation port.

As so far explained, the circuit of FIGURE 6 has operated with a ground at terminal I. This ground is not necessary however since the entire bridge is isolated from ground. Hence, it may be eliminated and the circuit will be operative. It will be observed that the circuit obtained by eliminating the ground in FIGURE 6 is identical to that of FIGURE 2 except for the elimination of the core 40. I have found that the presence of the core 40 reduces losses in the circuit but is not essential to the operation of the hybrid circuit.

It may also be noted that if the terminal I is grounded, the C line is unnecessary and the C port may be considered to be the bridge terminals III and I. The A and B lines cannot be eliminated however, since they equalize the delays to the A–A′ and B–B′ ports respectively.

It will thus be seen that I have provided an improved construction for hybrid circuits which use six transmission lines, four of which are connected to form a bridge or cross and the other two of which ae connected to the diagonal terminals of the cross or bridge. In the hybrid cicuits which I have provided there is a substantial reduction in the amount of ferrite beads or cores required. From the foregoing examples, it is apparent that no more than four cores or four separate strings of beads are required, and in the case of twisted pair transmission lines as few as two cores may be used. As compared to the constructions heretofore available, my improved constructions as explained above provide reduced loss, low cost and in many cases reduced physical size.

It will thus be seen that the objects set forth above, among those made apparent from the preceding description, are efficiently attained and, since certain changes may be made in the above constructions without departing from the scope of the invention, it is intended that all matter contained in the above description shall be interpreted as illustrative and not in a limiting sense.

Having described my invention, what I claim as new and desire to secure by Letters Patent is:

1. A four port transmission line hybrid circuit formed from six transmission lines, the terminals at one end of each of four of said lines being electrically connected in a bridge configuration with each transmission line forming one side of said bridge and the terminals at one end of each of the other two transmission lines being electrically connected to diagonally opposite terminals of said bridge, one set of diagonally opposite terminals being connected to one end of one of the other two transmission lines and a second set of diagonally opposite terminals of the bridge being connected to the other transmission line, the ends of opposed transmission lines forming said bridge not connected to said bridge being electrically connected together, each of said lines being associated with at least one ferrite element, the total number of separate ferrite elements associated with all of said lines being not more than four and not less than two in number, the ports of said hybrid being formed by the terminal of said lines not connected to said bridge.

2. The combination defined in claim 1 in which one terminal of each of said ports is grounded and which utilizes three ferrite elements.

3. The combination defined in claim 2 in which two non-opposed lines forming said bridge and one line whose terminals are connected across the diagonal terminals of said bridge are associated with a first ferrite element, another line forming said bridge and the second line whose terminals are connected across the other diagonal terminals of said bridge are associated with a second ferrite element, and the fourth line forming said bridge is associated with a third ferrite element.

4. The combination defined in claim 1 in which one terminal of each of said ports is grounded, and in which two non-opposed lines forming said bridge and a first line whose terminals are connected across the diagonal terminals of said bridge are associated with a first ferrite element all of said lines traversing said ferrite element in the same direction, the other two non-opposed lines and second line whose terminals at one end are connected across the diagonal terminals of said bridge being associated with a second ferrite element, one of said non-opposed bridge forming lines traversing said second ferrite element in a direction opposite to the direction of traverse by the other two lines.

5. The combination defined in claim 4 in which said ferrite elements are annular cores and said transmission lines are formed of twisted pairs of wires.

6. The combination defined in claim 1 in which the pair of ports formed by the opposed lines forming said bridge are ungrounded and the pair of ports formed by the non-bridge-connected ends of the lines whose terminals are connected to diagonally opposite terminals of said bridge are grounded, and in which first and second ferrite elements are associated with each of said non-bridge forming lines, and third and fourth ferrite elements are associated with each of the opposed pairs of lines forming said bridge, said opposed lines traversing its associated ferrite element in a direction opposite to the direction of the other opposed line of said pair.

7. The combination defined in claim 6 in which said opposed transmission lines forming said bridge are formed of twisted pairs of wires and said third and fourth ferrite elements are annular ferrite cores.

8. The combination defined in claim 1 in which the pair of ports formed by the opposed lines forming said bridge are ungrounded and the pair of ports formed by the non-bridge-connected ends of the lines whose terminals are connected to diagonally opposite terminals of said bridge are grounded, and in which a first pair of said opposed lines and the lines whose terminals are connected to diagonally opposite terminals of said bridge are associated with a first ferrite element, said opposed lines traversing said first element in opposite directions and said lines connected to diagonal terminals of said bridge traversing said first ferrite element in opposite directions, said second pair of opposed lines being associated with a second ferrite element and traversing said second ferrite element in opposite directions, and a third ferrite element associated with said non-bridge forming lines, both of said non-bridge forming lines traversing said third ferrite element in the same direction.

9. The combination defined in claim 8 in which said transmission lines are twisted pairs of wires and said ferrite elements are annular cores.

10. A four port transmission line hybrid circuit formed from six transmission lines, the terminals at one end of each of four of said lines, being electrically connected in a bridge configuration with each transmission line forming one side of said bridge and the terminals at one end of each of the other two transmission lines being electrically connected to diagonally opposite terminals of said bridge, one set of diagonally opposite terminals being connected to one end of one of the other two transmission lines and a second set of diagonally opposite terminals of the bridge being connected to the other transmission line, the ends of opposed transmission lines forming said bridge not connected to said bridge being electrically connected together, the ports of said hybrid being formed by the terminals of said lines not connected to said bridge and each of said ports being grounded, a first of said lines forming said bridge and one line whose terminals are connected across the diagonal terminals of said bridge being associated with a first ferrite element and traversing said element in the same direction, another of said lines forming said bridge which is not opposed to said first line being associated with a second ferrite element.

References Cited

UNITED STATES PATENTS

| | | | |
|---|---|---|---|
| 3,305,800 | 2/1967 | Velsink | 333—26 X |
| 3,311,850 | 3/1967 | Podell | 333—11 |

HERMAN KARL SAALBACH, Primary Examiner

P. L. GENSLER, Assistant Examiner

U.S. Cl. X.R.

333—25